Jan. 15, 1929.

R. H. KRUEGER 1,698,887

GAS ANALYSIS APPARATUS

Filed Aug. 27, 1927

INVENTOR
Richard H. Krueger
BY
Frak C. Lucks.
ATTORNEY

Patented Jan. 15, 1929.

1,698,887

UNITED STATES PATENT OFFICE.

RICHARD H. KRUEGER, OF NEWARK, NEW JERSEY, ASSIGNOR TO CHARLES ENGAL-HARD, INC., OF NEWARK, NEW JERSEY, A CORPORATION OF NEW JERSEY.

GAS-ANALYSIS APPARATUS.

Application filed August 27, 1927. Serial No. 215,961.

This improvement relates more particularly to means for adjustably varying the heat dissipating capacity of thermal conductivity cells, thereby providing mechanical means for equalizing the rate of heat dissipation from the cells of the gas to be analyzed and of the reference gas.

The method of gas analysis by the use of thermal conductivity cells in a Wheatstone bridge is well known, and it is known that for the best results, compensation for temperature variations should be effected in order to obtain balanced bridge conditions at different temperatures. This is especially important when the analysis cells in a Wheatstone bridge are used for measuring differentials, as is the case in an analysis unit for determining impurities in a gas or gas mixture.

The object, therefore, of my improvement is to provide mechanical means or devices for adjustably varying the heat dissipating capacity of the individual cells, so that by suitable adjustment an equilibrium can be obtained in the heat dissipation, so as to eliminate errors from this source, particularly when the apparatus is exposed to different temperatures.

Obviously this compensation may be effected in various ways, but, in the present instance, it is preferably accomplished by providing means for interposing, in varying amount, a shield or auxiliary heat absorbing device, in a manner to cut down the radiation reaching the cell walls. When the resistance thermometers are mounted in the cells it is impossible, in ordinary commercial practice, to mount the resistance elements central, or in the same relative position in all the cells, to thereby insure that the proper amount of heat shall be dissipated, under all test conditions, according to the calibration of the instrument. It is also impossible to construct the resistance thermometers so that, when mounted in the cells, all the heating elements will radiate the same amount of heat within the respective cells.

Therefore, by means of my improvement, any such variations in the amount of heat radiated or adapted to be dissipated through the walls of the cells can be compensated for and, when an instrument has been once properly calibrated and adjusted, the readings will not require corrections for variations in room temperatures or for other reasons.

One form of my improvement is shown in the accompanying drawings wherein

Figure 1:
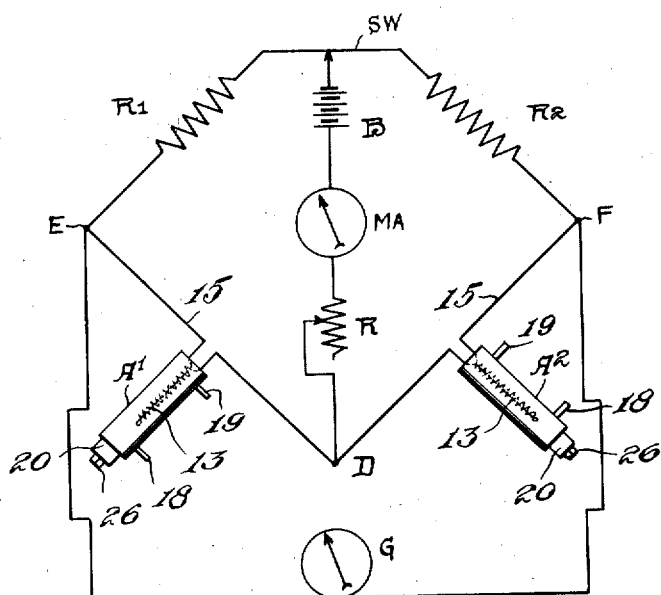
Figure 1 is a diagram of the Wheatstone bridge with my improved thermal conductivity cells.

Referring to the drawings and particularly to Figure 1 it will be seen that my improved gas analysis apparatus comprises the well known Wheatstone bridge, wherein the usual manganin ratio resistance coils $R^1$ and $R^2$ may be inserted in adjacent arms of the bridge.

Between the fixed resistances $R^1$ and $R^2$ a slide wire S—W is shown, and may be used for balancing the bridge. Between the slide wire S—W and the opposite point D of the bridge there is preferably connected, in circuit with a source of current such as the battery B, a milliammeter M—A, and a rheostat R for varying the flow of current.

Figure 2:
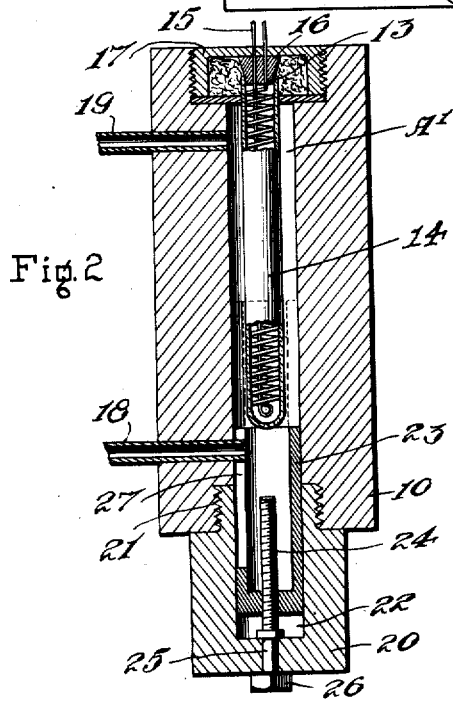
Figure 2 shows a longitudinal section through one of the thermal conductivity cells, on the line 2—2 of Figure 3, with mechanical means for adjusting the capacity for dissipating heat.

The other arms of the Wheatstone bridge, as shown in Figure 1, contain the gas analysis cells $A^1$ and $A^2$, one of which is more particularly shown in section in Figure 2.

The galvanometer G, for direct reading of the variations in the gas under analysis, is placed in circuit across the points E and F of the bridge.

When the ratio arms $R^1$ and $R^2$ are exactly alike in resistance and temperature coefficient, it is quite possible that the bridge is not in balance even when the same gas mixture is passed through both analysis cells $A^1$ and $A^2$. One reason for this is that the rate of heat dissipation in the two cells is different, due to the fact that the resistance thermometers or heating elements are not in the same relative position in both cells or not radiating the same amount of heat within the cells.

Balancing the bridge by means of the slide wire S—W will not remedy the defect if the temperature coefficients and resistance of the two cells $A^1$ and $A^2$ are different, as hereinbefore indicated. The proper remedy is to vary the volume of the chamber of one or both of the analysis cells, or in some way vary or control the rate of heat dissipation so as to compensate for the difference in resistance or heat coefficients and obtain an equalization in the heat dissipation of the cells $A^1$ and $A^2$.

Figure 3:
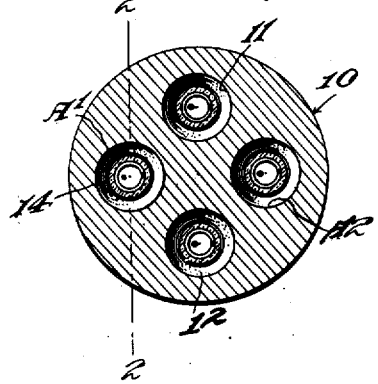
Figure 3 is a transverse section of a metal block or cell unit containing cells for each of the four arms of the Wheatstone bridge.

The cells $A^1$ and $A^2$ are preferably formed in a block of metal 10, which, as shown in Figure 3, is preferably also provided with holes or chambers 11 and 12 for the ratio coils $R^1$ and $R^2$, for which resistance thermometers may be substituted. In the latter case, the cells 11 and 12 may be filled with reference gas or they may be used in conjunction with the cells $A^1$ and $A^2$. As will be seen in Figure 2 the analysis thermal conductivity cells are provided with a resistance heating coil 13 which is preferably formed of platinum wire wound on a quartz rod and sealed in a quartz tube 14. The ends 15 of the heating coil are brought out through a sealing cork 16 in the upper end of the tube 14, the latter being mounted in the upper end of the cell and held therein by a screw cap 17. The reference gas, or the gas to be analyzed, may be passed through the cell by tubes 18 and 19, the gas preferably entering through the tube 18.

As previously pointed out, it is practically impossible to mount the resistance thermometers 13 and 14 absolutely central, or in the same relative position in all the analysis or thermal conductivity cells, so they have the same radiation and heat dissipation. Therefore, in order to compensate for any such variations I preferably bore out the lower end of the cell and insert therein a heavy metal plug 20, screw threaded into the cell block 10, or at 21. The plug 20 is bored out or formed with a pocket 22, in which a shield tube or thimble 23 is slidably mounted. The lower end of the shield thimble is preferably closed except for a screw threaded opening in which an adjusting screw 24 operates. The shank 25 of the screw 24 passes through a hole in the lower end of the pocket 22, in the plug 20, and is provided with a nut-like head 26, whereby the position of the shield 23 may be adjusted. In order to prevent rotation of the tubular thimble 23 a longitudinal slot 27, therein, cooperates with the end of the gas inlet tube 18, which projects into the cell for this purpose, as shown in Figure 2.

In operation it will be understood that, with my improvement, the reference gas or, at least, the same gas or gas mixture is first passed through all the analysis cells and adjustments made of the shields 23 to obtain equalization of the heat dissipation. When all the resistances in the bridge are correct any out of balance is caused by unequal radiation or dissipation of heat. Heretofore, to correct for this, it required days of tests and calibration adjustments, but with my improvement such errors can be eliminated in a few minutes, by simply adjusting the shield members 23 by means of the screws 24. The shield thimbles 29 may be arranged to provide for ample adjustment, as indicated by dotted lines in Figure 2. The shield tubes 23 preferably are spaced from the lower ends of the resistance thermometers and slide up thereabout without contact therewith. Thus by covering or uncovering the lower ends of the respective resistance thermometers 13—14 the heat dissipation of the several thermal conductivity gas analysis cells can be equalized and properly calibrated to give correct readings over a wide range of temperatures.

While I have shown the preferred form of my improvement, it will be understood that I do not wish to be limited to the specific details of construction shown for various modifications therein may be made without departing from the spirit and scope of the invention.

Having thus described my invention, what I claim as new and desire to secure by Letters Patent, is:—

1. A gas analysis apparatus comprising a resistance heating element mounted in a thermal conductivity cell having walls adapted for dissipating heat, and adjustable means for varying the capacity of said walls for dissipating the heat.

2. A gas analysis apparatus comprising a thermal conductivity cell, the walls of which are adapted to facilitate the dissipation of heat, a resistance heating element mounted in said cell, and mechanical means for modifying the rate of dissipation of the walls of the cell of heat radiated from said heating element.

3. A gas analysis apparatus comprising thermal conductivity cells for the reference gas and for the analysis gas, resistance heating elements in each cell, and means associated with the heating elements of the respective cells for equalizing the heat dissipation of the cells.

4. A gas analysis apparatus comprising a plurality of thermal conductivity cells, resistance heating elements in said cells, and mechanical devices associated with said cells for varying the capacity of the respective cells for dissipating heat.

5. A gas analysis apparatus comprising a thermal conductivity cell, with walls adapted for absorbing and dissipating heat, a resistance heating element mounted in said cell, a device for varying the discharge of heat from said resistance element to the walls of the cell, and means for effecting relative adjustment between said device and the resistance element.

6. A gas analysis apparatus comprising a thermal conductivity cell, a resistance heating element mounted in said cell, a tubular shield mounted for movement between said heating element and the walls of the cell to vary the heat dissipation of the cell and a screw for moving said shield to vary its position in the cell.

7. A gas analysis apparatus comprising a thermal conductivity cell, a heating element mounted in said cell, a shield mounted for movement between said heating element and the walls of the cell to vary the heat dissipation of the cell, and means for varying the position of the shield in the cell.

This specification signed this 25th day of August, 1927.

RICHARD H. KRUEGER.

CERTIFICATE OF CORRECTION.

Patent No. 1,698,887.  Granted January 15, 1929, to

RICHARD H. KRUEGER.

It is hereby certified that the name of the assignee in the above numbered patent was erroneously written and printed as "Charles Engalhard, Inc.", whereas said name should have been written and printed as "Charles Engelhard, Inc.", as shown by the records of assignments in this office; and that the said Letters Patents should be read with this correction therein that the same may conform to the record of the case in the Patent Office.

Signed and sealed this 26th day of February, A. D. 1929.

(Seal)

M. J. Moore,
Acting Commissioner of Patents.

DISCLAIMER 1,698,887.—*Richard H. Krueger*, Newark, N. J. GAS-ANALYSIS APPARATUS. Patent dated January 15, 1929. Disclaimer filed August 9, 1930, by the assignee, *Charles Engelhard, Inc.*

Hereby enters this disclaimer to claim 3 of said patent which is in the following words, to wit:

"3. A gas analysis apparatus comprising thermal conductivity cells for the reference gas and for the analysis gas, resistance heating elements in each cell, and means associated with the heating elements of the respective cells for equalizing the heat dissipation of the cells."

[*Official Gazette August 26, 1930.*]

vary the heat dissipation of the cell and a screw for moving said shield to vary its position in the cell.

7. A gas analysis apparatus comprising a thermal conductivity cell, a heating element mounted in said cell, a shield mounted for movement between said heating element and the walls of the cell to vary the heat dissipation of the cell, and means for varying the position of the shield in the cell.

This specification signed this 25th day of August, 1927.

RICHARD H. KRUEGER.

CERTIFICATE OF CORRECTION.

Patent No. 1,698,887.  Granted January 15, 1929, to

RICHARD H. KRUEGER.

It is hereby certified that the name of the assignee in the above numbered patent was erroneously written and printed as "Charles Engalhard, Inc.", whereas said name should have been written and printed as "Charles Engelhard, Inc.", as shown by the records of assignments in this office; and that the said Letters Patents should be read with this correction therein that the same may conform to the record of the case in the Patent Office.

Signed and sealed this 26th day of February, A. D. 1929.

M. J. Moore,
Acting Commissioner of Patents.

(Seal)

DISCLAIMER 1,698,887.—*Richard H. Krueger*, Newark, N. J. GAS-ANALYSIS APPARATUS. Patent dated January 15, 1929. Disclaimer filed August 9, 1930, by the assignee, *Charles Engelhard, Inc.*

Hereby enters this disclaimer to claim 3 of said patent which is in the following words, to wit:

"3. A gas analysis apparatus comprising thermal conductivity cells for the reference gas and for the analysis gas, resistance heating elements in each cell, and means associated with the heating elements of the respective cells for equalizing the heat dissipation of the cells."

[*Official Gazette August 26, 1930.*]

DISCLAIMER 1,698,887.—*Richard H. Krueger*, Newark, N. J. GAS-ANALYSIS APPARATUS. Patent dated Januaiy 15, 1929. Disclaimer filed August 9, 1930, by the assignee, *Charles Engelhard, Inc.*

Hereby enters this disclaimer to claim 3 of said patent which is in the following words, to wit:

"3. A gas analysis apparatus comprising thermal conductivity cells for the reference gas and for the analysis gas, resistance heating elements in each cell, and means associated with the heating elements of the respective cells for equalizing the heat dissipation of the cells."

[*Official Gazette August 26, 1930.*]